United States Patent
Suzuki (10) Patent No.: US 12,177,405 B2
(45) Date of Patent: Dec. 24, 2024

(54) IMAGE FORMING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Takanobu Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/401,767

(22) Filed: Jan. 2, 2024

(65) Prior Publication Data
US 2024/0251051 A1    Jul. 25, 2024

(30) Foreign Application Priority Data

Jan. 20, 2023 (JP) ................................ 2023-007420

(51) Int. Cl.
*H04N 1/04* (2006.01)
*H04N 1/34* (2006.01)

(52) U.S. Cl.
CPC .................................. *H04N 1/344* (2013.01)

(58) Field of Classification Search
USPC ....................................................... 358/1.16
See application file for complete search history.

(56) References Cited

U.S. PATENT DOCUMENTS 7,641,843 B2    1/2010    Taemmerich et al.
2003/0038960 A1*   2/2003    Dempsey ............... G06K 15/16
                                                 358/1.15

FOREIGN PATENT DOCUMENTS

JP           2006035856 A        2/2006

\* cited by examiner

*Primary Examiner* — Cheukfan Lee
(74) *Attorney, Agent, or Firm* — Venable LLP (57) ABSTRACT

An image forming apparatus includes: an acquisition unit that acquires service information; a storage unit that stores the service information acquired by the acquisition unit; and a control unit that controls, based on the service information stored in the storage unit, accounting processing performed along with execution of a function of the image forming apparatus. The control unit executes first accounting processing based on a fact that first service information is stored in the storage unit, and executes second accounting processing different from the first accounting processing based on a fact that second service information different from the first service information is stored in the storage unit.

19 Claims, 9 Drawing Sheets

|  | MONOCHROME | COLOR |
|---|---|---|
| A1 | ¥50 | ¥100 |
| A2 | ¥30 | ¥60 |
| A3 | ¥15 | ¥30 |
| A4 | ¥10 | ¥20 |
| POSTCARD | ¥5 | ¥10 |

| No. | ITEM | DETAILS |
|---|---|---|
| 1 | SUBSCRIBER NUMBER | 123456789 |
| 2 | SUBSCRIBER ID | AAA |
| 3 | SUBSCRIBER PASSWORD | BBB |
| 4 | SUBSCRIBER NAME | CCC |
| 5 | CONSUMABLE DELIVERY DESTINATION ADDRESS | DDD |
| 6 | TELEPHONE NUMBER | EEE |
| 7 | PAYMENT METHOD | CREDIT |
| 8 | CONTRACTED SERVICE | FIRST FLAT-RATE SERVICE |

FIG. 11

IMAGE FORMING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an image forming apparatus capable of executing accounting processing, a method, and a non-transitory computer-readable storage medium storing a program.

Description of the Related Art

There are known a flat-rate service that allows a user to use, at a flat rate, both an image forming apparatus main body dedicated for the service and a consumable used for printing and a flat-rate service that allows a user who has an image forming apparatus to use, at a flat rate, a consumable used for printing. The former service will be referred to as a first flat-rate service hereinafter, and the latter service will be referred to as a second flat-rate service hereinafter. In the second flat-rate service, the main body is sold out and thus the user has the ownership of the main body. In the first flat-rate service, a service provider side has the ownership of the image forming apparatus main body and a consumable. Furthermore, in the first flat-rate service, since the flat-rate service provider prepares a consumable necessary for printing and the image forming apparatus main body, a printing environment is prepared for the user only by making a contract. In such flat-rate service, a server on the service provider side manages information of an image forming apparatus used in the service. Therefore, to transmit print result information to the server, it is necessary to connect the image forming apparatus to a network.

It is also known to perform accounting processing based on the print result of the user. Japanese Patent Laid-Open No. 2006-35856 describes calculation of a charging amount based on a toner consumption.

SUMMARY OF THE INVENTION

Accounting processing may be different depending on a service contracted by a user. Therefore, it is required to execute appropriate accounting processing in accordance with a service contracted by a user.

The present invention provides an image forming apparatus for executing appropriate accounting processing in accordance with a contracted service, a method, and a non-transitory computer-readable storage medium storing a program.

The present invention in one aspect provides an image forming apparatus comprising: at least one memory and at least one processor which function as: an acquisition unit configured to acquire service information; a storage unit configured to store the service information acquired by the acquisition unit; and a control unit configured to control, based on the service information stored in the storage unit, accounting processing performed along with execution of a function of the image forming apparatus, wherein the control unit executes first accounting processing based on a fact that first service information is stored in the storage unit, and executes second accounting processing different from the first accounting processing based on a fact that second service information different from the first service information is stored in the storage unit.

According to the present invention, it is possible to execute appropriate accounting processing in accordance with a contracted service.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1:
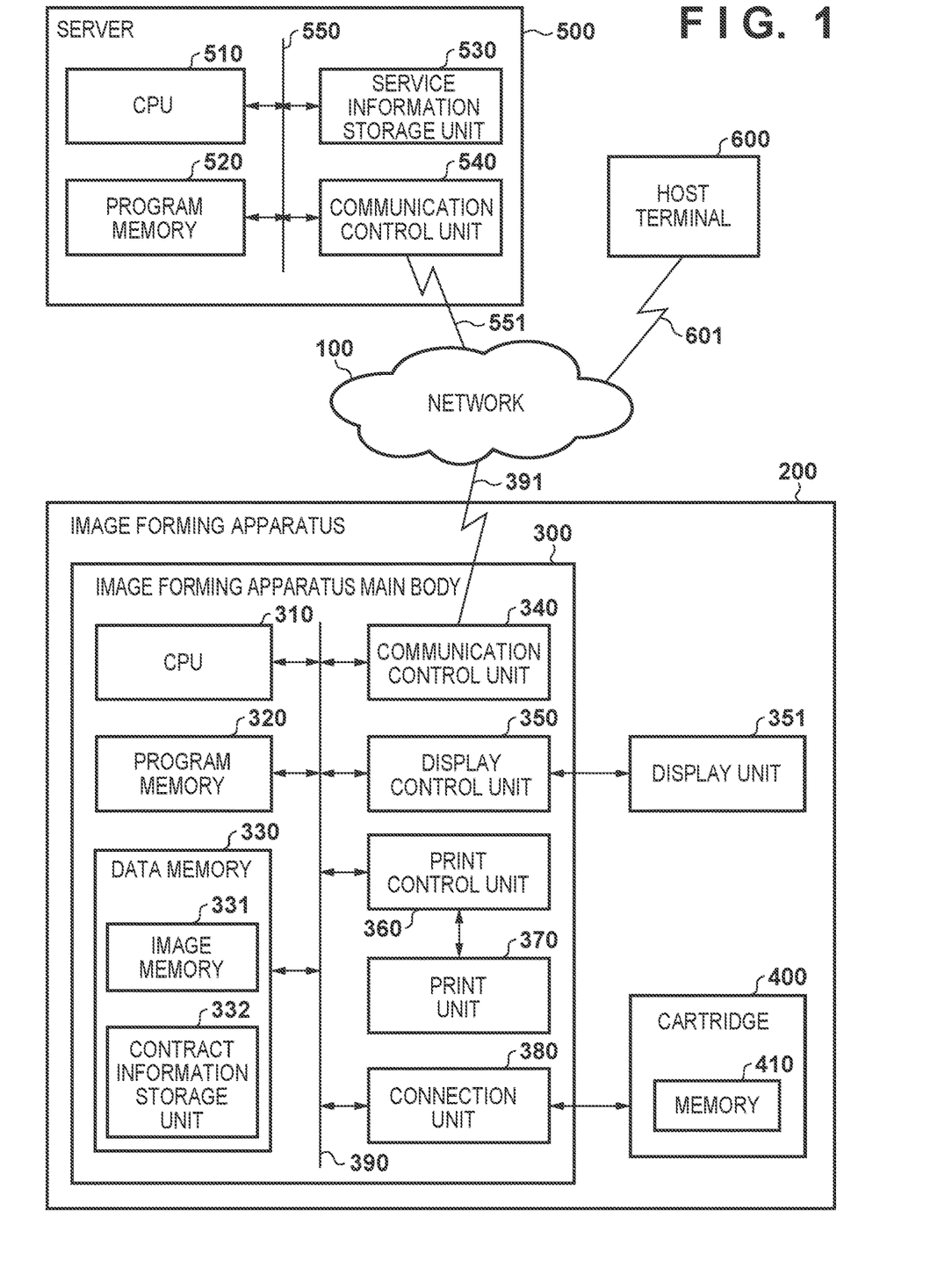
FIG. 1 is a view showing the arrangement of an image processing system.

FIG. 1 is a view showing an example of the arrangement of an image processing system 100 according to an embodiment. The image processing system 100 includes an image forming apparatus 200 having a print function, a flat-rate service server 500 (to be referred to as a server 500 hereinafter), and a host terminal 600. The image processing system 100 is a system that allows a user to use a flat-rate service. The flat-rate service is, for example, a service that provides a printing environment having the feature that the same amount is charged until a predetermined number of sheets are printed, in accordance with a monthly plan fee. In a case where the predetermined number of sheets is exceeded, for example, a measured rate system for increasing a charging amount for each sheet is adopted. If the user accesses the server 500 to apply for the flat-rate service, a service provider delivers the image forming apparatus 200 including a consumable to the home of the user. After the image forming apparatus 200 is delivered to the home of the user, the user performs initial installation (setup) including network connection, and then the user starts to use the image forming apparatus 200. The image forming apparatus 200 creates a log along with execution of the function of the image forming apparatus 200 such as the print function, and transmits the log to the server 500. Based on the information of the received log, the server 500 grasps the number of print sheets for one month, calculates the consumption rate of the consumable, and executes delivery processing of the consumable at a timing when the remaining amount of the consumable is small. In the above description, after the user applies for the flat-rate service, the image forming apparatus 200 is delivered to the home of the user. However, after the image forming apparatus 200 is delivered to the home of the user, the user may apply for the flat-rate service.

The image forming apparatus 200 includes an image forming apparatus main body 300 that performs a print operation using a printing material, a display unit 351, and a cartridge 400 that is attachable to the image forming apparatus main body 300 via a connection unit 380 and is filled with ink used as a printing material. The image forming apparatus main body 300 includes a CPU 310, a program memory 320, a data memory 330, a communication control unit 340, a display control unit 350, a print control unit 360, a print unit 370, and the connection unit 380.

The CPU 310 is a system control unit, and comprehensively controls the overall image forming apparatus 200. The program memory 320 stores control programs to be executed by the CPU 310, an embedded operating system (OS) program, an application program, and the like. For example, the operation of the image forming apparatus 200 according to this embodiment is implemented when the CPU 310 reads out a program stored in the program memory 320 and executes the readout program. The data memory 330 includes an image memory 331 and a contract information storage unit 332.

The data memory 330 stores program control variables and the like, and is provided with, for example, various work buffer areas used at the time of processing of the print control unit 360. The image memory 331 accumulates image data processed by an image processing unit (not shown). The image processing unit executes, for example, image processing in accordance with a user operation on an application, data conversion in print processing, or the like. The contract information storage unit 332 holds contract information of the flat-rate service received by the image forming apparatus main body 300 from the server 500 via the communication control unit 340. In this embodiment, the contract information of the flat-rate service held in the contract information storage unit 332 includes information indicating one of a flat-rate service uncontracted state, a first flat-rate service contracted state, and a second flat-rate service contracted state.

This embodiment assumes two types of flat-rate services, that is, the first flat-rate service that allows the user to use the image forming apparatus 200 and the consumable at a flat rate and the second flat-rate service that allows the user who has purchased the image forming apparatus 200 to use the consumable at a flat rate. In the second flat-rate service, since the main body is sold out, the user has the ownership of the main body. In the first flat-rate service, the service provider side has the ownership of the main body and the consumable. Furthermore, in the first flat-rate service, since the flat-rate service provider prepares the consumable necessary for printing and the image forming apparatus main body, a printing environment is prepared for the user only by making a contract. In other words, the first flat-rate service is a service in a form that the user uses the image forming apparatus 200 by renting it.

The communication control unit 340 controls data communication with the outside via a communication line 391. The communication line 391 may include a wired communication line, a wireless communication line, or both of them. The display control unit 350 controls display of various screens such as a user interface screen on the display unit 351. Note that the display unit 351 may be formed as, for example, a touch panel that can accept a user operation.

The print control unit 360 acquires print data from the image memory 331, and controls print processing in the print unit 370. The print control unit 360 may include the above-described image processing unit. The print unit 370 includes a printhead that can discharge ink droplets from a nozzle onto a print medium, and a carriage mounted with the printhead and configured to be movable in a scanning direction. Note that this embodiment assumes that the print unit 370 is configured to print an image on the print medium by an inkjet printing method but the present invention is not limited to the inkjet printing method. For example, the print unit 370 may be configured to print an image on the print medium by an electrophotographic printing method. The print unit 370 executes print processing based on a print command from the print control unit 360. Furthermore, for example, the print control unit 360 generates, as print information, a print result log in which job information such as a copy or print, a print amount, and a print result are described. For example, the print information is generated on a job basis, and is transmitted to the server 500 via the communication control unit 340 at a predetermined timing.

The CPU 310, the program memory 320, the data memory 330, the communication control unit 340, the display control unit 350, the print control unit 360, and the connection unit 380 are communicably connected to each other via a CPU bus 390.

The cartridge 400 is a cartridge that can store ink, and it includes a memory 410. For example, the cartridge 400 is formed for each of ink colors of cyan, magenta, yellow, and black. The memory 410 records cartridge information including information for identifying the cartridge 400 and remaining ink amount information. The information for identifying the cartridge 400 is, for example, a serial number assigned when the cartridge is manufactured. The cartridge information representing the remaining ink amount information is information concerning the remaining amount of the ink in the cartridge, and may be represented using, for example, a unit of volume or a remaining amount level divided by a predetermined threshold. The cartridge 400 need only be a cartridge that is filled with a printing material used for printing and can be detached from the connection unit 380 to be replaced. Therefore, the cartridge 400 is not limited to only the ink cartridge, and may be, for example, a toner cartridge.

The server 500 includes a CPU 510, a program memory 520, a service information storage unit 530, and a communication control unit 540. The CPU 510 is a system control unit, and comprehensively controls the overall server 500. The program memory 520 stores control programs to be executed by the CPU 510, an embedded operating system (OS) program, and the like. For example, the operation of the server 500 according to this embodiment is implemented when the CPU 510 reads out a program stored in the program memory 520 and executes the readout program.

The service information storage unit 530 manages information concerning a flat-rate service provided by the server 500. The server 500 may be formed as a server having a plurality of server functions, and it may have a server function of a device management server. For example, the service information storage unit 530 holds print information such as the information (user information) of a user who has contracted the flat-rate service, the identification information (for example, the serial number) of the image forming apparatus used in the flat-rate service, and a print result log transmitted from the image forming apparatus 200.

The communication control unit 540 controls data communication with the outside via a communication line 551. The communication line 551 may include a wired communication line, a wireless communication line, or both of them. The CPU 510, the program memory 520, the service information storage unit 530, and the communication control unit 540 are communicably connected to each other via a CPU bus 550.

The host terminal 600 is connected to a network such as the Internet, and it is an information processing apparatus that can communicate with the server 500 and the image forming apparatus 200. The host terminal 600 is, for example, a smartphone or PC held by the user of the image forming apparatus 200.

The image processing system 100 is not limited to the arrangement shown in FIG. 1. For example, a router including an access point for connecting the image forming apparatus 200 to the network may be included. The image forming apparatus 200 and the host terminal 600 may be connected via the router or may be connected directly. The image forming apparatus 200 and the host terminal 600 may be connected by wired communication or wireless communication. Each apparatus of the image processing system 100 is not limited to the arrangement shown in FIG. 1, and appropriately has an arrangement in accordance with a function executable by the apparatus. Furthermore, FIG. 1 shows one server 500 but a server that can provide another service may be included. The plurality of servers may be formed as the server 500. The server 500 may be formed by a single server apparatus or may be formed as a server system including a plurality of server apparatuses.

Figure 2:
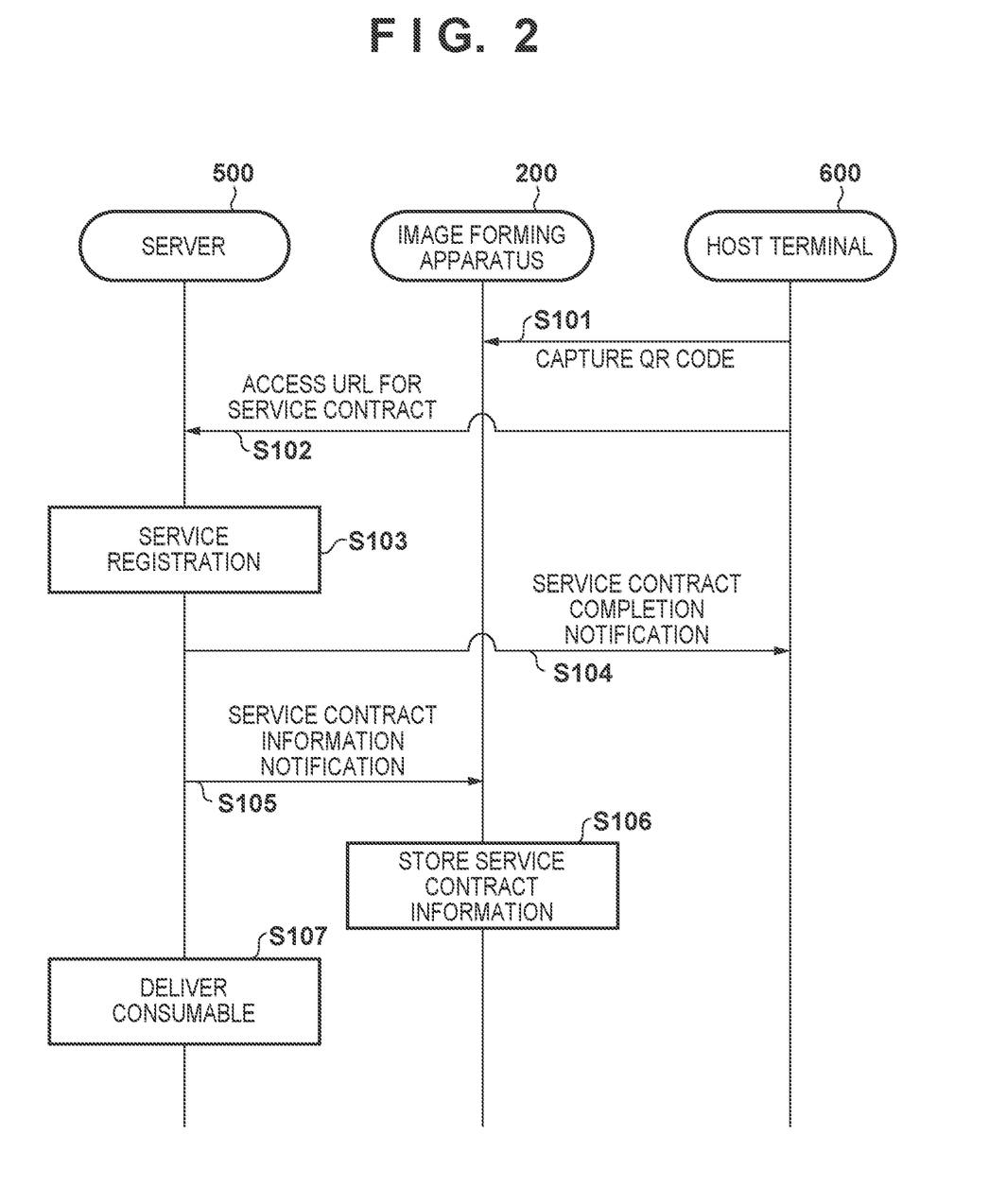
FIG. 2 is a sequency chart performed among apparatuses.

An example of processing performed among the apparatuses when the user starts to use the image forming apparatus 200 by the flat-rate service will be described next with reference to FIG. 2. If the sequence shown in FIG. 2 is started, it is assumed that the image forming apparatus 200 has been delivered to the home of the user and the initial installation of the image forming apparatus 200 is complete. That is, it is assumed that the image forming apparatus 200 is connected to the network via the communication line 391. In the following sequence, the information of the image forming apparatus 200 is registered in the server 500, and thus user information, the information of the image forming apparatus 200, and service information are linked with each other.

When the sequence shown in FIG. 2 is started, the user instructs, from a main screen (not shown), to display a two-dimensional code corresponding to a desired flat-rate service on the display unit 351 of the image forming apparatus 200. The two-dimensional code is, for example, a QR Code®, and includes the URL information of the server 500 which the user accesses to contract the flat-rate service.

In S101, the host terminal 600 acquires the URL information of the two-dimensional code displayed on the display unit 351 of the image forming apparatus 200. For example, the host terminal 600 acquires the URL information of the two-dimensional code by an image capturing operation by the user. Then, in S102, the host terminal 600 accesses the server 500 based on the acquired URL information. At this time, in the host terminal 600, a screen for registration in the flat-rate service is displayed by a Web browser or a dedicated application. The user inputs information necessary for registration in the service. The information necessary for registration in the service includes, for example, user information such as a service subscriber name, the type of the service to be contracted, the delivery destination of a consumable, a fee payment method, and identification information such as the product number of the image forming apparatus 200. In S103, the server 500 registers, in the service information storage unit 530, the information input in S102. If the input of the information necessary for the service contract is normally complete, the server 500 transmits a service contract completion notification to the host terminal 600 by email or the like in S104. Furthermore, in S105, the server 500 transmits contract information to the image forming apparatus 200.

Figure 10:
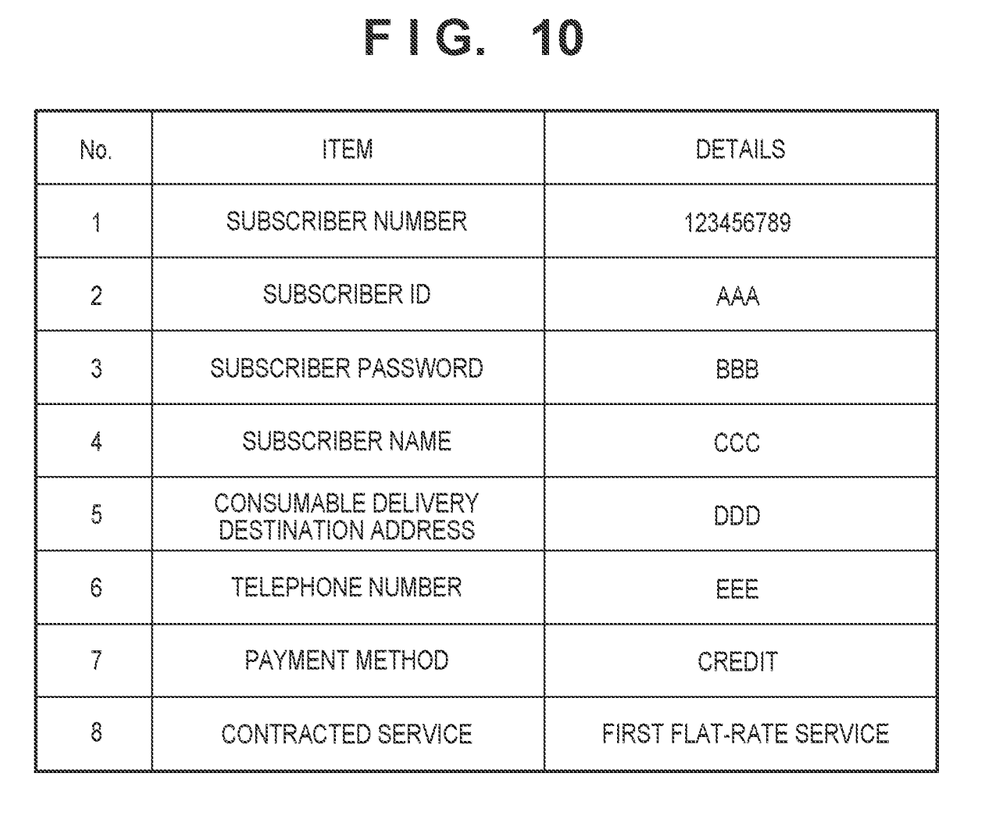
FIG. 10 is a table showing control information.

FIG. 10 is a table showing an example of a database storing the contract information of the flat-rate service. The contract information includes user information such as a subscriber number, a subscriber ID, a subscriber password, and a subscriber name. In addition, the contract information includes information such as the address of the delivery destination of the consumable, a telephone number, a payment method, and the type of the contracted service. The type of the contracted service stores, for example, information indicating one of the flat-rate service uncontracted state, the first flat-rate service contracted state, and the second flat-rate service contracted state. For example, if the flat-rate service is optionally contracted by the user and the user has not contracted the service in S102, the information indicating the flat-rate service uncontracted state can be stored. The contract information is not limited to the information shown in FIG. 10 and may include other information. For example, the contract information may include the information of the image forming apparatus 200, details of a contracted flat-rate service plan, and a contract change count. In this embodiment, the contract information shown in FIG. 10 includes at least the type of the contracted service, and the image forming apparatus 200 controls accounting processing in accordance with the type of the contracted service, as will be described later with reference to FIG. 3. Therefore, in other words, the contract information shown in FIG. 10 and including the type of the contracted service is used as control information for controlling accounting processing.

If the input of the information necessary for the service contract is not normally complete, information indicating that the input of the information is not normally complete is transmitted to the host terminal 600 in S104, and the subsequent processing is not executed. In S106, the server 500 receives the contract information transmitted from the server 500 in S105 and stores the contract information in the contract information storage unit 332. This allows the user to use the image forming apparatus 200 in the flat-rate service for which the user has applied to the server 500.

While the user uses the image forming apparatus 200, the image forming apparatus 200 transmits the above-described print information to the server 500 at a predetermined timing. For example, the print information may be transmitted at a timing when a job is executed or may collectively be transmitted at a predetermined time in a case where a plurality of jobs are executed. In S107, for example, if the server 500 determines, based on the print information, that the remaining amount of the consumable of the image forming apparatus 200 is small (equal to or smaller than a threshold), the server 500 executes delivery processing of delivering the consumable to the registered delivery destination.

The accounting processing executed by the image forming apparatus 200 will be described next.

Figure 3:
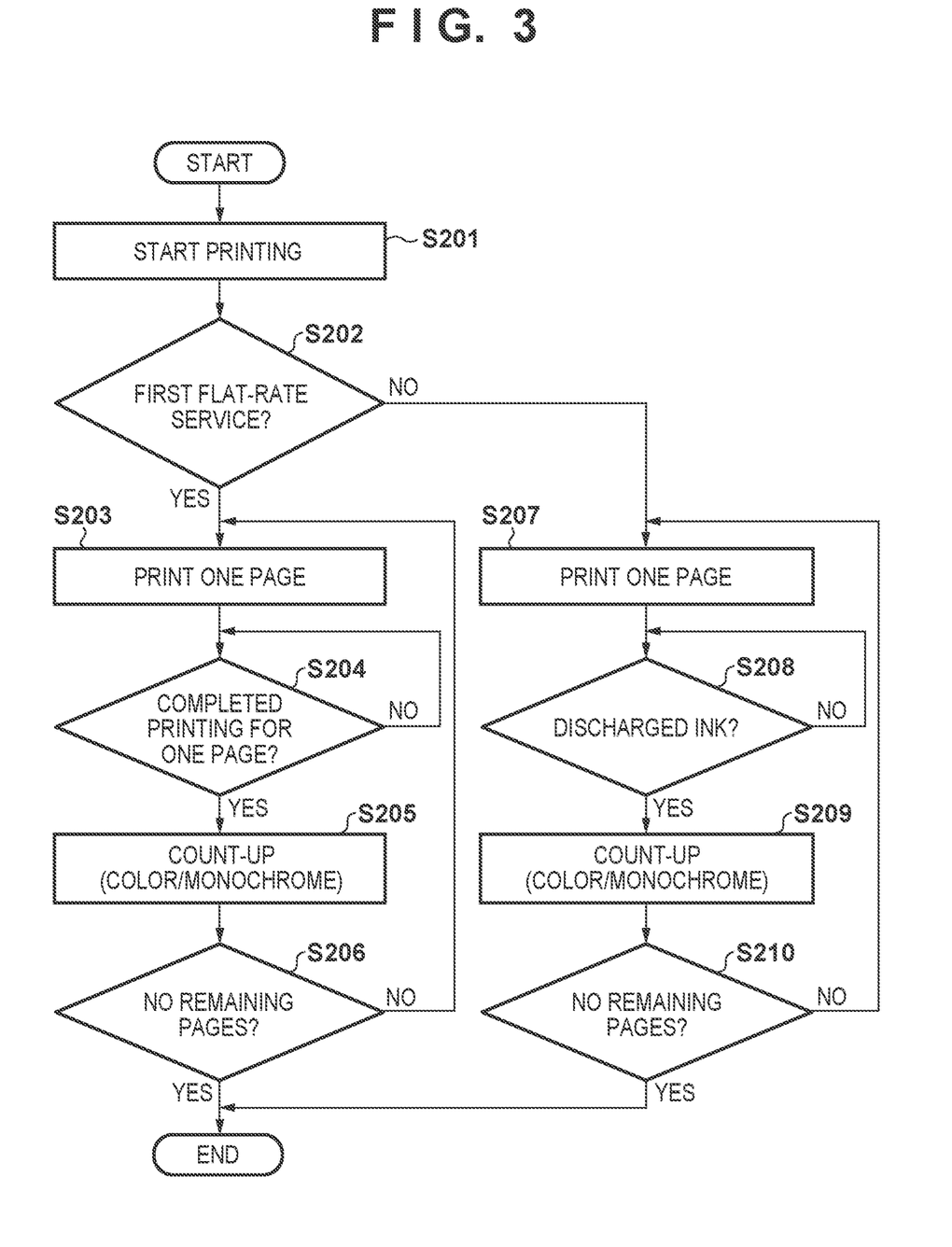
FIG. 3 is a flowchart illustrating accounting processing executed by an image forming apparatus.

FIG. 3 is a flowchart illustrating the accounting processing executed by the image forming apparatus 200. The processing shown in FIG. 3 is implemented when, for example, the CPU 310 reads out a program stored in the program memory 320 and executes the readout program.

In step S201, when the user instructs the image forming apparatus 200 to execute printing, the CPU 310 starts print processing. Then, while starting the print processing, the CPU 310 acquires the type of the contracted service with reference to the contract information held in the contract information storage unit 332.

In step S202, the CPU 310 determines whether the type of the contracted service of the contract information held in the contract information storage unit 332 is the first flat-rate service. Note that in this example, it is determined whether the type of the contracted service is the first flat-rate service. However, it may be determined whether the type of the contracted service is the first flat-rate service or the second flat-rate service. If it is determined that the type of the contracted service is the first flat-rate service, the process advances to step S203.

In step S203, the CPU 310 starts to execute printing for one page based on print data. In step S204, the CPU 310 determines whether printing for one page is complete. If it is determined that printing for one page is incomplete, the processing in step S204 is repeated. On the other hand, if it is determined that printing for one page is complete, the CPU 310 performs count-up in the accounting processing in step S205. In this example, count-up indicates accumulation of a charging amount, and is performed based on, for example, a charging amount determined based on a paper type and a color mode.

Figure 4:
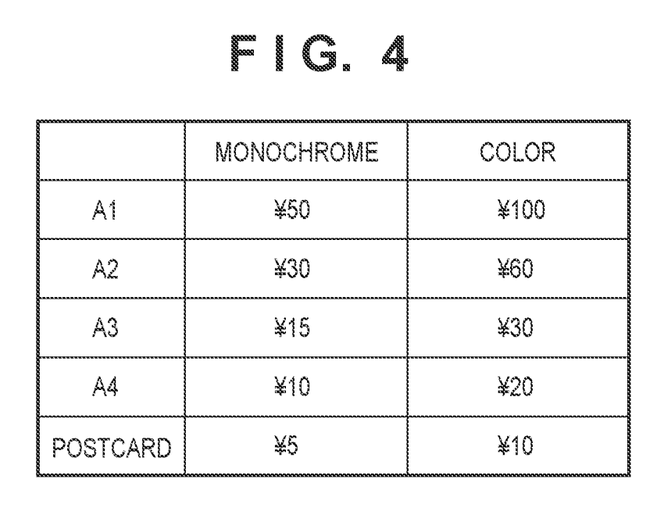
FIG. 4 is a table used for count-up in the accounting processing.

FIG. 4 is a table showing an example of a table used for count-up in the accounting processing. The table shown in FIG. 4 is an example in which a charging amount is determined based on a paper type and a color mode. For example, for one page of A1 size paper, 50 yen is charged in the case of monochrome printing and 100 yen is charged in the case of color printing. The table shown in FIG. 4 is stored in, for example, the data memory 330. Furthermore, in FIG. 4, the size is defined as a paper type but a sheet type such as glossy paper may be defined. In addition, two modes of a monochrome mode and a color mode are defined as printing modes, but the present invention is not limited to these two modes and another mode determined by a gray scale, a tint, or the like may be defined.

In step S206, the CPU 310 determines whether there is a remaining page which has not undergone print processing. If it is determined that there is a remaining page, the CPU 310 repeats the processes from step S203; otherwise, the CPU 310 ends the processing shown in FIG. 3.

If it is determined in step S202 that the type of the contracted service is not the first flat-rate service, the process advances to step S207. In step S207, the CPU 310 starts to execute printing for one page based on print data. In step S208, the CPU 310 determines whether the print unit 370 has discharged ink droplets. The determination processing in step S208 may be performed based on, for example, whether the nozzle of the printhead has been driven. If it is determined that ink droplets have not been discharged, the CPU 310 repeats the processing in step S208. On the other hand, if it is determined that ink droplets have been discharged, the CPU 310 executes count-up in the accounting processing in step S209. The processing in step S209 is the same as that in step S205.

In step S210, the CPU 310 determines whether there is a remaining page which has not undergone print processing. If it is determined that there is a remaining page, the CPU 310 repeats the processes from step S207; otherwise, the CPU 310 ends the processing shown in FIG. 3.

That is, if the type of the contracted service is the first flat-rate service, the image forming apparatus 200 performs count-up of the charging amount upon completion of printing for one page. On the other hand, if the type of the contracted service is the second flat-rate service, the image forming apparatus 200 performs count-up of the charging amount upon discharging ink droplets. That is, accounting processing corresponding to the type of the contracted service is performed. Note that in this embodiment, there are the two types of the contracted services but there may be three or more types of contracted services. For example, another accounting processing not shown in FIG. 3 may be performed for a flat-rate service limited to a specific ink color or paper type. In this case, as another accounting processing, accounting processing using a table different from that shown in FIG. 4 may be performed.

In this embodiment, as the condition of count-up of the charging amount, there are a condition of whether printing for one page is complete and a condition of whether ink droplets have been discharged. Another condition may be used. For example, in step S204, based on the fact that printing has been executed for a region of 80% or more of a print region for one page, instead of the completion of printing for one page, it may be determined that printing for one page has been executed, thereby counting up the charging amount. Alternatively, based on the fact that the total amount of ink discharged during printing exceeds 0.1 ml, it may be determined that printing for one page has been executed, thereby counting up the charging amount. The determination processing in step S204 may be performed not for one page but for a plurality of pages.

In step S208, the ratio of a printed area to a print sheet may be used as the condition of count-up of the charging amount. Alternatively, the amount of ink consumed for printing may be used as the condition of count-up of the charging amount. It has been described that the CPU 310 acquires the type of the contracted service from the contract information storage unit 332 in step S201. However, the CPU 310 may acquire, from the server 500, information with which it is possible to determine the type of the contracted service in step S202.

Next, processing performed when the user changes the type of the contracted service will be described. As an example, assume here that the user has contracted the first flat-rate service, and the user changes the first flat-rate service to the second flat-rate service.

Figure 5:
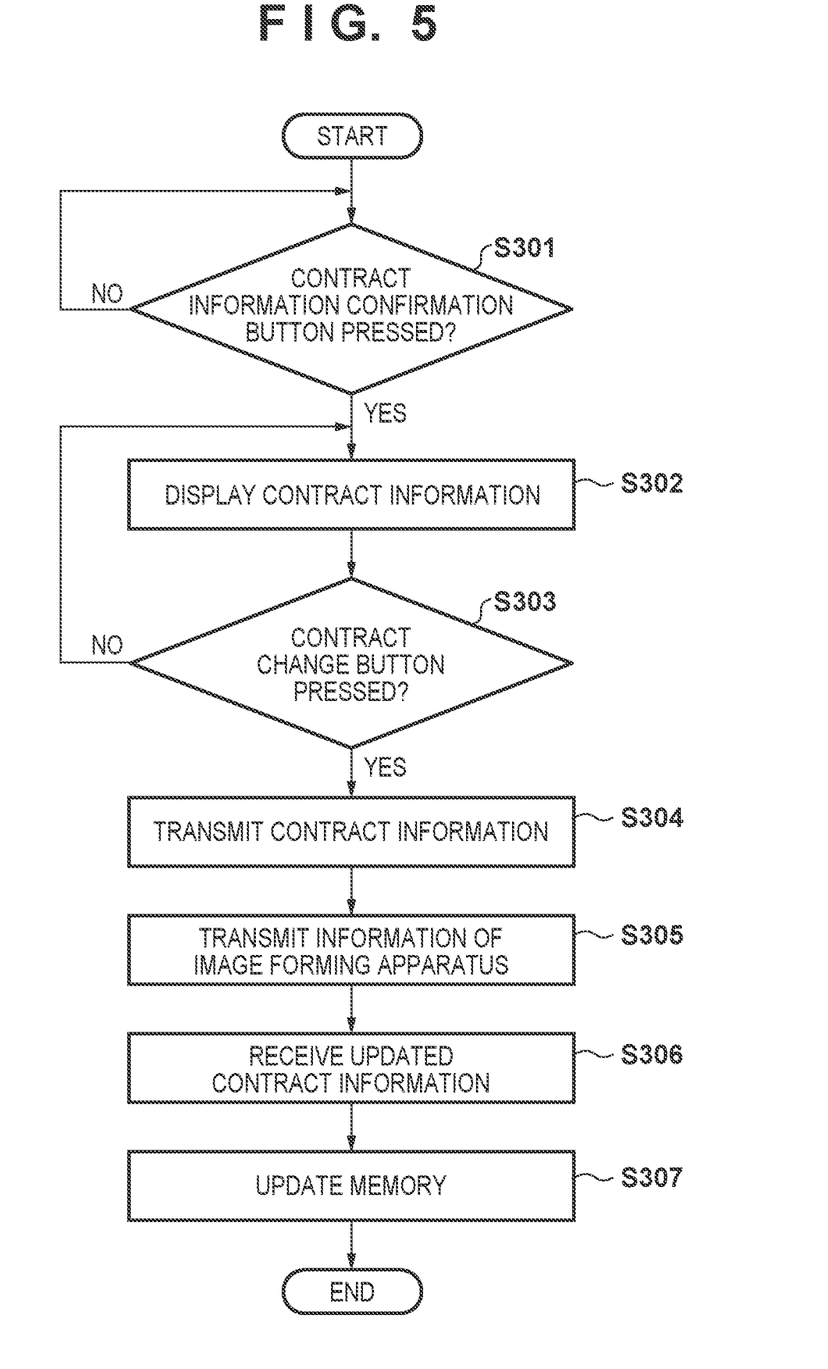
FIG. 5 is a flowchart illustrating processing executed by the image forming apparatus.

FIG. 5 is a flowchart illustrating processing executed by the image forming apparatus 200 when the user changes the contracted service. The processing shown in FIG. 5 is implemented when, for example, the CPU 310 reads out a program stored in the program memory 320 and executes the readout program. Assume that a main screen (not shown) is displayed on the display unit 351 before the start of the processing shown in FIG. 5.

In step S301, the CPU 310 determines whether an item displaying contract information currently contracted by the user has been selected on the main screen. The determination processing in step S301 may be performed based on, for example, whether a contract information confirmation button (menu button) on the main screen has been pressed, and the arrangement will be described below. If it is determined that the contract information confirmation button has not been pressed, the processing in step S301 is repeated. On the other hand, if it is determined that the contract information confirmation button has been pressed, the process advances to step S302.

Figure 7:
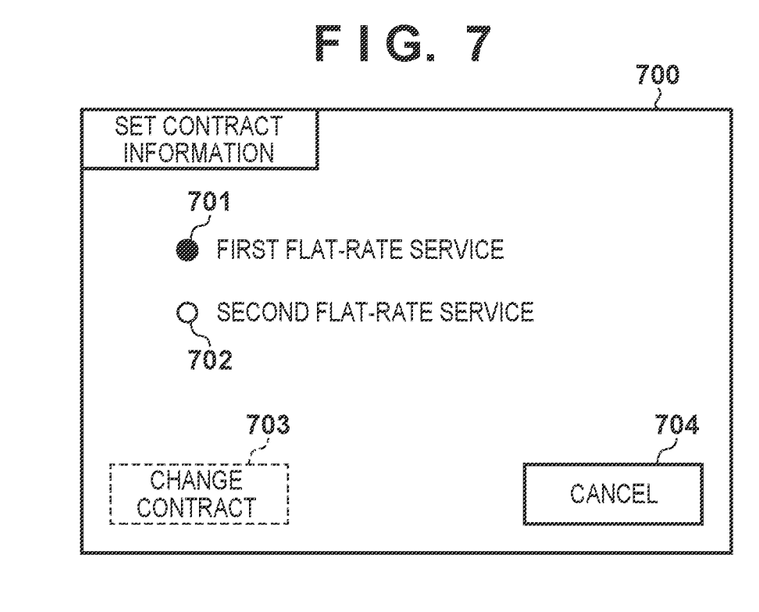
FIG. 7 is a view showing a user interface screen.

In step S302, the CPU 310 displays, on the display unit 351, a setting screen indicating the contract information currently contracted by the user. FIG. 7 is a view showing an example of the setting screen displayed at this time. On a setting screen 700 shown in FIG. 7, the first flat-rate service and the second flat-rate service are displayed to be selectable by buttons 701 and 702, respectively. Since the user currently contracts the first flat-rate service, the setting screen 700 is displayed in a state in which the button 701 is selected. Note that the CPU 310 may display the setting screen 700 based on the type of the contracted service of the contract information stored in the contract information storage unit 332.

Figure 8:
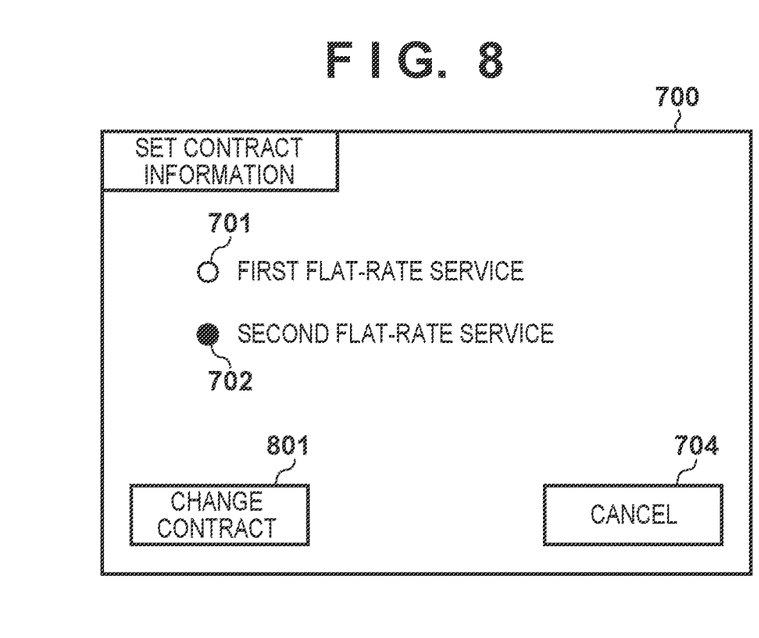
FIG. 8 is a view showing a user interface screen.

When the user changes the first flat-rate service to the second flat-rate service, he/she presses the button 702. If the user presses the button 702 in the setting screen 700, the setting screen 700 is displayed, as shown in FIG. 8. That is, a contract change button 703 displayed in an inactive state in FIG. 7 is displayed in an active state. Note that the contract change button displayed in the active state is indicated by a contract change button 801 in FIG. 8. Note that a cancel button 704 is a button that is pressed when the user cancels the change of the type of the contracted service. If the cancel button 704 is pressed, the setting screen 700 is closed to return to the main screen.

Figure 9:
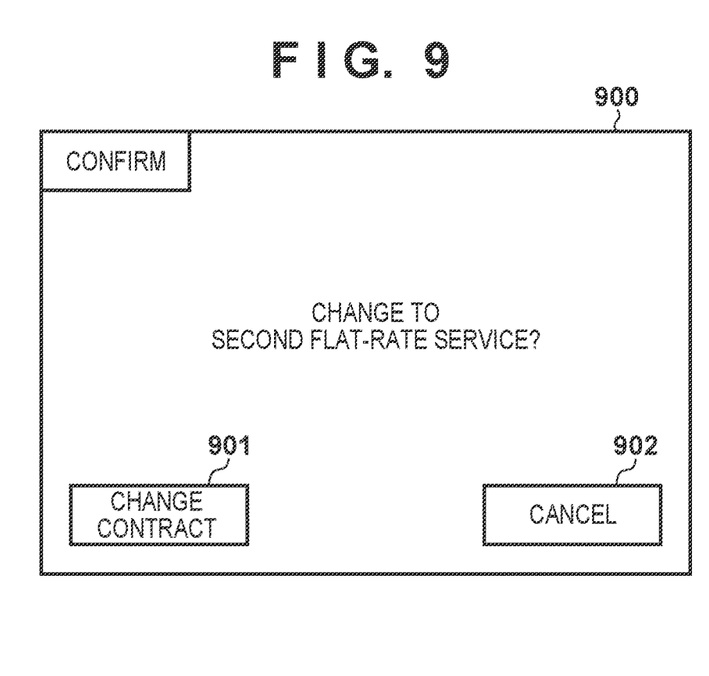
FIG. 9 is a view showing a user interface screen.

In step S303, the CPU 310 determines whether the contract change button 801 has been pressed. If it is determined that the contract change button 801 has not been pressed, the CPU 310 repeats the processes from step S302. On the other hand, if it is determined that the contract change button 801 has been pressed, the CPU 310 displays a screen for prompting the user to confirm whether to change the type of the contracted service. FIG. 9 is a view showing an example of a confirmation screen 900 displayed at this time. The confirmation screen 900 includes a message that prompts the user to confirm the change to the second flat-rate service, a contract change button 901, and a cancel button 902. If a user instruction is accepted by pressing the contract change button 901, the process advances to step S304. Upon the pressing of the cancel button 902, the confirmation screen 900 is closed to return to the main screen. Note that the confirmation screen 900 may be controlled not to be displayed in a case where a contract change count as the number of changes of the contracted service by the user is equal to or larger than a threshold.

In step S304, the CPU 310 transmits, to the server 500, a change request and the contract information stored in the contract information storage unit 332. In this example, the change request includes information indicating the second flat-rate service as a change destination selected on the setting screen 700. Then, in step S305, the CPU 310 transmits the identification information of the image forming apparatus 200 to the server 500.

Processing executed by the server 500 will now be described.

Figure 6:
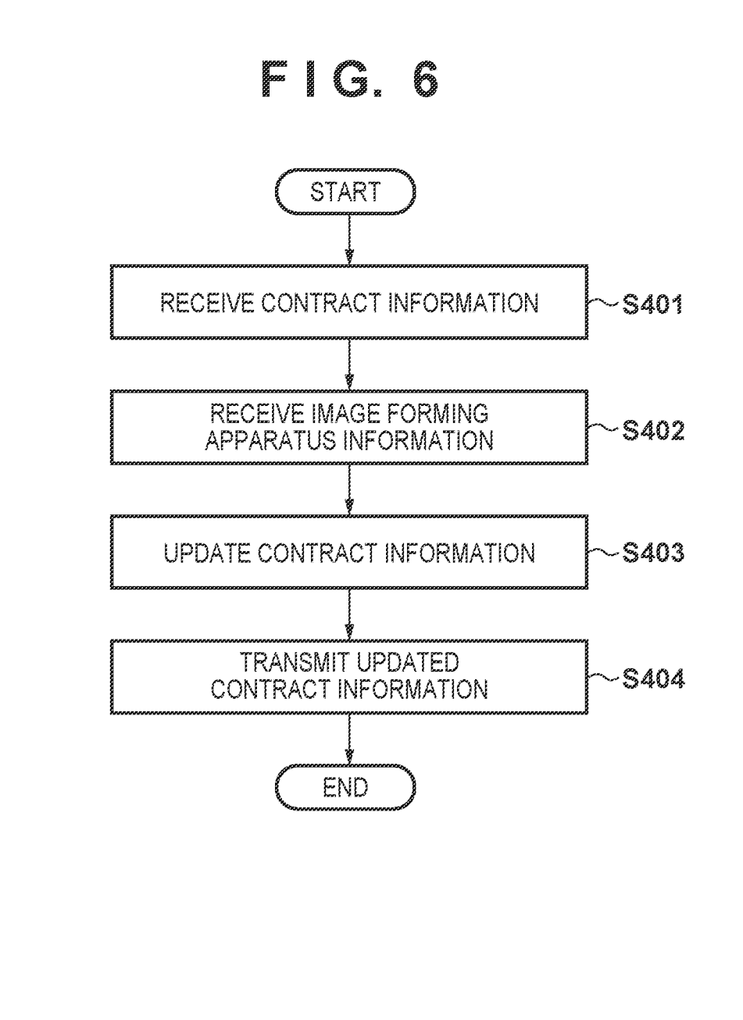
FIG. 6 is a flowchart illustrating processing executed by a server.

FIG. 6 is a flowchart illustrating the processing executed by the server 500. The processing shown in FIG. 6 is implemented when, for example, the CPU 510 reads out a program stored in the program memory 520 and executes the readout program.

In step S401, the CPU 510 receives the change request and the contract information transmitted from the image forming apparatus 200 in step S304. Then, in step S402, the CPU 510 receives the identification information of the image forming apparatus 200 transmitted from the image forming apparatus 200 in step S305.

In step S403, the CPU 510 changes (updates) the contract information based on the change request received in step S401. In this example, the contents of the type of the contracted service of No. 8 in FIG. 10 are changed from "first flat-rate service" to "second flat-rate service". In other words, the contract information shown in FIG. 10 is updated, as described above. Note that before executing the processing in step S403, the CPU 510 may determine, based on the identification information of the image forming apparatus 200 received in step S402, whether to change the contract information received in step S401. For example, in a case where the received identification information of the image forming apparatus 200 does not match the contract information and the information of the transmission source of the change request, the CPU 510 may determine not to change the contract information.

In step S404, the CPU 510 transmits the changed (updated) contract information to the image forming apparatus 200 together with a contract information change completion notification. After that, the CPU 510 ends the processing shown in FIG. 6.

Figure 11:
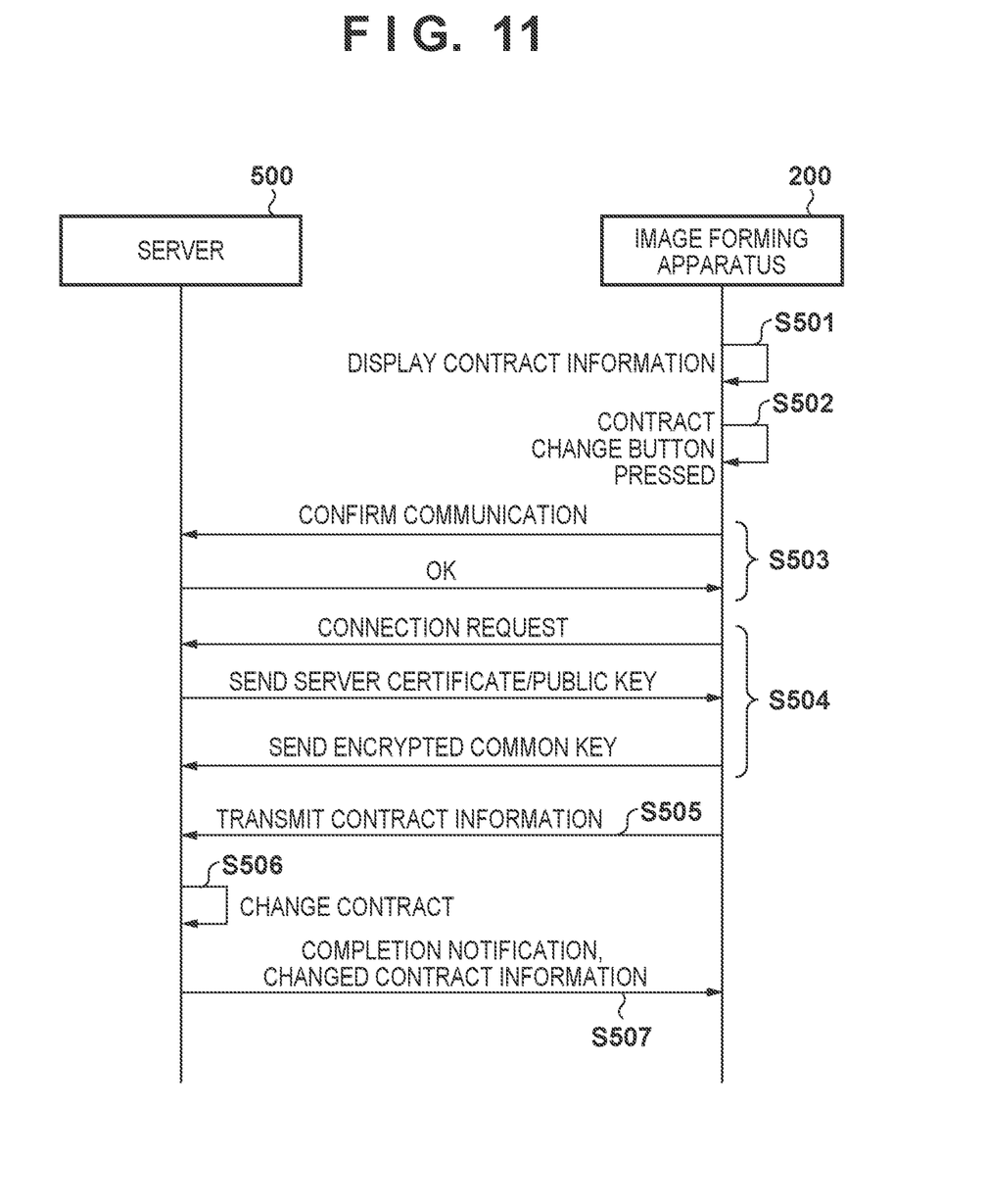
FIG. 11 is a sequence chart showing communication processing executed between the server and the image forming apparatus.

FIG. 11 is a sequence chart showing an example of communication processing executed between the server 500 and the image forming apparatus 200 when the processes shown in FIGS. 5 and 6 are executed. The contract information is transmitted and received between the server 500 and the image forming apparatus 200 in a state in which security is ensured by Hypertext Transfer Protocol Secure (HTTPS) communication.

S501 corresponds to the processing of displaying the contract information in step S302 of FIG. 5. S502 corresponds to a case where the contract change button is pressed in step S303. In S503, negotiation of an authentication method is performed between the server 500 and the image forming apparatus 200. In S504, server authentication by a server certificate and generation of a common key for encrypting the contract information are performed. Therefore, in S505 corresponding to step S304 of FIG. 3, the contract information and the change request are encrypted by the common key generated in S504. Note that although not shown in FIG. 11, the identification information of the image forming apparatus 200 is also encrypted by the common key generated in S504. S506 corresponds to step S403 of FIG. 6. S507 corresponds to step S404 of FIG. 6.

Reference is made to FIG. 5 again.

After step S404 of FIG. 6 is executed, the CPU 310 receives, in step S306 of FIG. 5, the changed contract information together with the contract information change completion notification. Then, in step S307, the CPU 310 overwrites and updates the contract information stored in the contract information storage unit 332 with the changed contract information received in step S306. After that, the CPU 310 ends the processing shown in FIG. 5.

In this example, with the processes shown in FIGS. 5 and 6, the type of the contracted service included in the contract information stored in the contract information storage unit 332 of the image forming apparatus 200 is changed from the first flat-rate service to the second flat-rate service. The example in which the user changes the first flat-rate service to the second flat-rate service on the setting screen 700 has been explained above. However, in a case where the user changes the second flat-rate service to the first flat-rate service, the contract information stored in the contract information storage unit 332 is changed in the same manner. The two types of services including the first flat-rate service and the second flat-rate service have been described above.

However, in the case of three or more types of services, the operation of this embodiment can be applied to change the contract information.

A case where the processing shown in FIG. 3 is started after the contract information stored in the contract information storage unit 332 is changed will be described. In the above example, before the contract information is changed, the type of the contracted service in the contract information is the first flat-rate service, and thus the accounting processing of steps S203 to S206 is executed when printing is started. On the other hand, after the contract information is changed, the type of the contracted service in the contract information is the second flat-rate service, and thus the accounting processing of steps S207 to S210 is executed when printing is started.

As described above, according to this embodiment, the contract information in the contract information storage unit 332 is updated, as needed, based on the change operation of the type of the contracted service by the user. Therefore, even if the user changes the type of the contracted service, it is possible to execute appropriate accounting processing corresponding to the type of the contracted service after the change without changing the arrangement of the image forming apparatus 200.

Furthermore, this embodiment has explained that the processing shown in FIG. 5 is executed by the image forming apparatus 200. However, the processes in steps S301 to S303 of FIG. 5 may be executed by the host terminal 600.

For example, the host terminal 600 determines whether an item displaying contract information currently contracted by the user has been selected on the displayed screen by accessing the URL of the server 500 (step S301). If it is determined that the item displaying the contract information has been selected, the setting screen indicating the contract information currently contracted by the user is displayed (step S302). The setting screen is, for example, the setting screen 700 shown in FIG. 7. Then, in the setting screen 700 shown in FIG. 8, the host terminal 600 determines whether the contract change button 801 has been pressed (step S303). If the contract change button 801 has been pressed, the host terminal 600 notifies the server 500 that the contract change button 801 has been pressed. At this time, the host terminal 600 may accept the input of the identification information of the image forming apparatus 200 from the user. Then, if the server 500 detects that the contract change button 901 of the confirmation screen 900 shown in FIG. 9 is pressed, the server 500 requests the image forming apparatus 200 to acquire the contract information. Upon receiving the request to acquire the contract information, the image forming apparatus 200 executes the processes from step S304 of FIG. 5.

As describe above, the contract information may be transmitted and received between the server 500 and the image forming apparatus 200 based on the fact that the host terminal 600 accepts the flat-rate service change operation.

This embodiment has explained that the processing shown in FIG. 6 is executed by the server 500. That is, this embodiment has explained that the contract information shown in FIG. 10 is updated by the server 500. However, after it is determined in step S303 that the contract change button 801 has been pressed, the CPU 310 of the image forming apparatus 200 may update, based on the information selected on the setting screen 700 and indicating the service as the change destination, the contract information of FIG. 10 stored in the contract information storage unit 332.

Furthermore, this embodiment has explained the arrangement of changing the contracted flat-rate service on the setting screen 700 shown in FIG. 7. Alternatively, for example, the user can cancel the contracted first flat-rate service, and then contract the second flat-rate service in accordance with the procedure shown in FIG. 2. In this case, while the first flat-rate service is contracted, the accounting processing of steps S203 to S205 may be performed. After the contract of the second flat-rate service is completed, the accounting processing of steps S207 to S209 may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-007420, filed Jan. 20, 2023, which is hereby incorporated by reference herein in its entirety.

What is claimed is:

1. An image forming apparatus comprising:
at least one memory and at least one processor which function as:
an acquisition unit configured to acquire service information;
a storage unit configured to store the service information acquired by the acquisition unit; and
a control unit configured to control, based on the service information stored in the storage unit, accounting processing performed along with execution of a function of the image forming apparatus,
wherein the control unit executes first accounting processing based on a fact that first service information is stored in the storage unit, and executes second accounting processing different from the first accounting processing based on a fact that second service information different from the first service information is stored in the storage unit.

2. The apparatus according to claim 1, wherein in a case where the acquisition unit acquires the second service information in a state in which the first service information is stored in the storage unit, the first service information stored in the storage unit is updated with the acquired second service information.

3. The apparatus according to claim 1, wherein in a case where the acquisition unit acquires the first service information in a state in which the second service information is stored in the storage unit, the second service information stored in the storage unit is updated with the acquired first service information.

4. The apparatus according to claim 1, wherein the first service information and the second service information are pieces of information each indicating a type of service.

5. The apparatus according to claim 1, wherein a service indicated by the first service information is a service in which a user has ownership of the image forming apparatus.

6. The apparatus according to claim 5, wherein a service indicated by the second service information is a service in which a service provider has the ownership of the image forming apparatus.

7. The apparatus according to claim 1, wherein the function of the image forming apparatus is a print function.

8. The apparatus according to claim 7, wherein the first accounting processing is accounting processing performed under a condition that printing in the image forming apparatus is complete.

9. The apparatus according to claim 8, wherein the first accounting processing is accounting processing performed under a condition that printing for one page is complete.

10. The apparatus according to claim 9, wherein
the at least one processor further functions as a first determination unit configured to determine whether the printing for one page is complete, and
in a case where the first determination unit determines that the printing for one page is complete, the control unit executes the first accounting processing.

11. The apparatus according to claim 10, wherein in a case where a printed region reaches a predetermined ratio with respect to the printing for one page, the first determination unit determines that the printing for one page is compete.

12. The apparatus according to claim 7, wherein the second accounting processing is accounting processing performed under a condition that printing in the image forming apparatus starts.

13. The apparatus according to claim 12, wherein
the at least one processor further functions as a second determination unit configured to determine whether printing in the image forming apparatus starts, and
in a case where the second determination unit determines that the printing in the image forming apparatus starts, the control unit executes the second accounting processing.

14. The apparatus according to claim 13, wherein the second determination unit determines, based on a fact that a printing material is consumed in the printing in the image forming apparatus, that the printing in the image forming apparatus starts.

15. The apparatus according to claim 1, wherein in each of the first accounting processing and the second accounting processing, a charging amount determined based on a type of a print medium on which the image forming apparatus executes printing is charged.

16. The apparatus according to claim 15, wherein the type of the print medium indicates at least one of a size and a sheet type.

17. The apparatus according to claim 1, wherein in each of the first accounting processing and the second accounting processing, a charging amount determined based on a type of a print mode in which the image forming apparatus executes printing is charged.

18. A method comprising:
acquiring service information;
storing the acquired service information in a storage unit; and
controlling, based on the service information stored in the storage unit, accounting processing performed along with execution of a function of an image forming apparatus,
wherein first accounting processing is executed based on a fact that first service information is stored in the storage unit, and second accounting processing different from the first accounting processing is executed based on a fact that second service information different from the first service information is stored in the storage unit.

19. A non-transitory computer-readable storage medium storing a program configured to cause a computer to function to:
acquire service information;
store the acquired service information in a storage unit; and
control, based on the service information stored in the storage unit, accounting processing performed along with execution of a function of an image forming apparatus,
wherein first accounting processing is executed based on a fact that first service information is stored in the storage unit, and second accounting processing different from the first accounting processing is executed based on a fact that second service information different from the first service information is stored in the storage unit.

* * * * *